Oct. 12, 1926.

H. L. MERRICK

WEIGHING MECHANISM

Filed Feb. 18, 1919

WITNESS
Chas. F. Clagett

INVENTOR
H. L. MERRICK
BY
John O. Seifert
ATTORNEY

Oct. 12, 1926.

H. L. MERRICK 1,602,831

WEIGHING MECHANISM

Filed Feb. 18, 1919  3 Sheets-Sheet 2

WITNESS
Chas. F. Clagett

INVENTOR
H. L. MERRICK
BY
John O. Seifert
ATTORNEY

Oct. 12, 1926.

H. L. MERRICK

WEIGHING MECHANISM

Filed Feb. 18, 1919

WITNESS
Chas F. Clagett

INVENTOR
H. L. MERRICK
BY
John O. Seifert
ATTORNEY

Patented Oct. 12, 1926.

1,602,831

UNITED STATES PATENT OFFICE.

HERBERT L. MERRICK, OF PASSAIC, NEW JERSEY.

WEIGHING MECHANISM.

Application filed February 18, 1919. Serial No. 277,732.

This invention relates to weighing mechanism in which the weight of a load placed upon a load receiver or platform is counterbalanced by counterpoise weight upon a scale beam, and it is an object of the invention to provide weighing mechanism of this character in which counterpoise weight is automatically applied to the scale beam to counterbalance a load on the receiver, and the scale beam relieved of such counterpoise weight when the load is removed from the load receiver.

It is a further object of the invention to provide in weighing mechanism of this character dial mechanism to indicate the weight of a load upon the load receiver, comprising a pointer to indicate upon a primary or unit dial the weight of loads upon the load receiver within a predetermined limit, and a supplemental or multiple unit dial to co-operate with the unit dial to indicate the weight of loads upon the receiver greater than such predetermined weight and within the capacity of the weighing mechanism, said indicating mechanism being operable from the weighing mechanism by the placing of a load upon the load receiver.

It is another object of the invention to provide weighing mechanism of this character in which the weighing of loads on the receiver within a predetermined weight are automatically weighed and the weight of the load indicated upon dial mechanism, and in which counterpoise weight is automatically applied to the weighing mechanism when loads greater than such predetermined weight are placed upon the load receiver, and the weight of such loads indicated on the dial mechanism, without the necessity of any manual operation whatever.

In the drawings accompanying and forming a part of this specification, Figure 1 is a front elevation of a weighing mechanism illustrating an embodiment of my invention and showing the parts in normal no load position and with the front of the casing enclosing the same removed.

Similar characters of reference designate like parts throughout the different views of the drawings.

Figure 1:
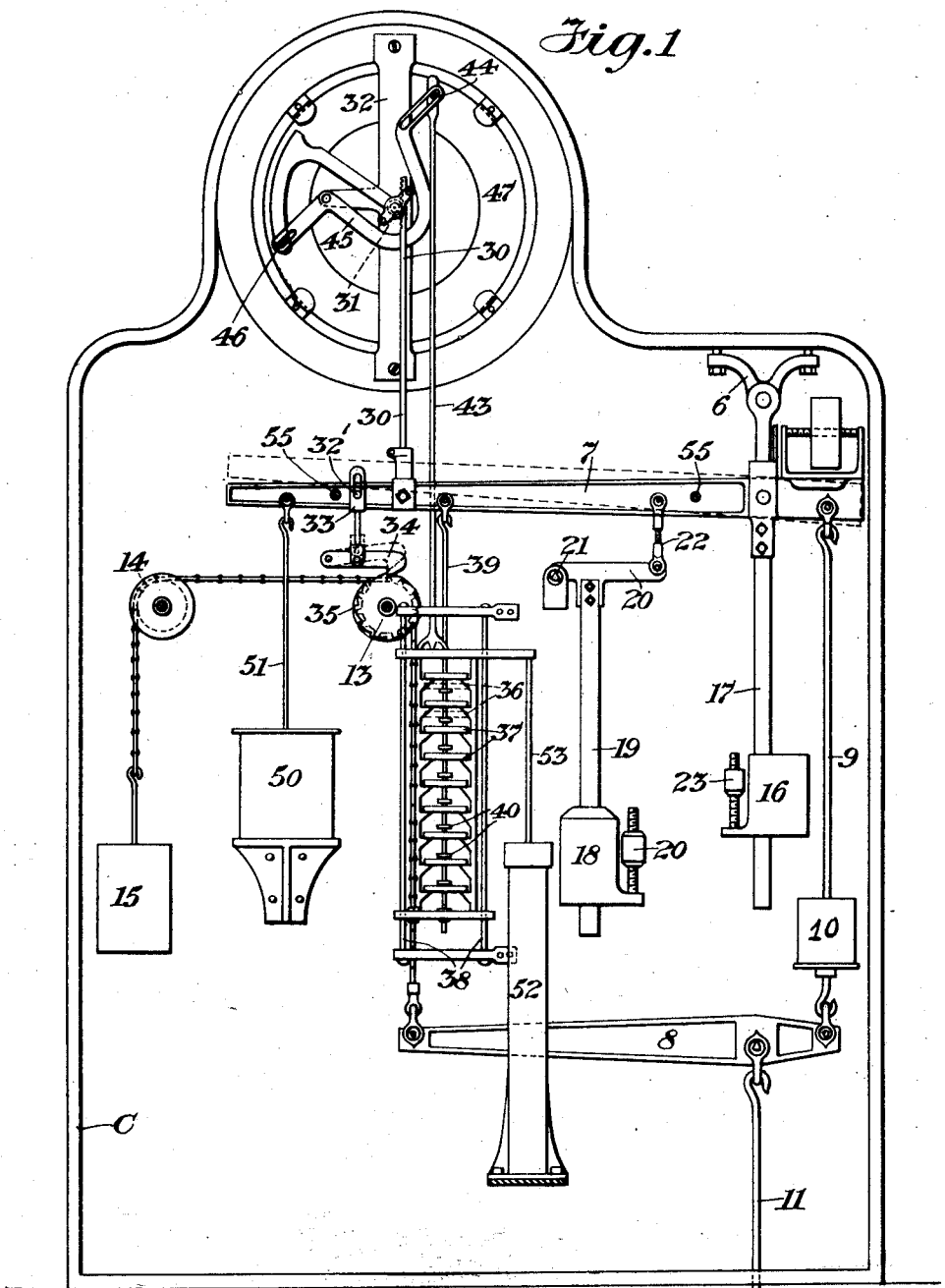
Figure 2:
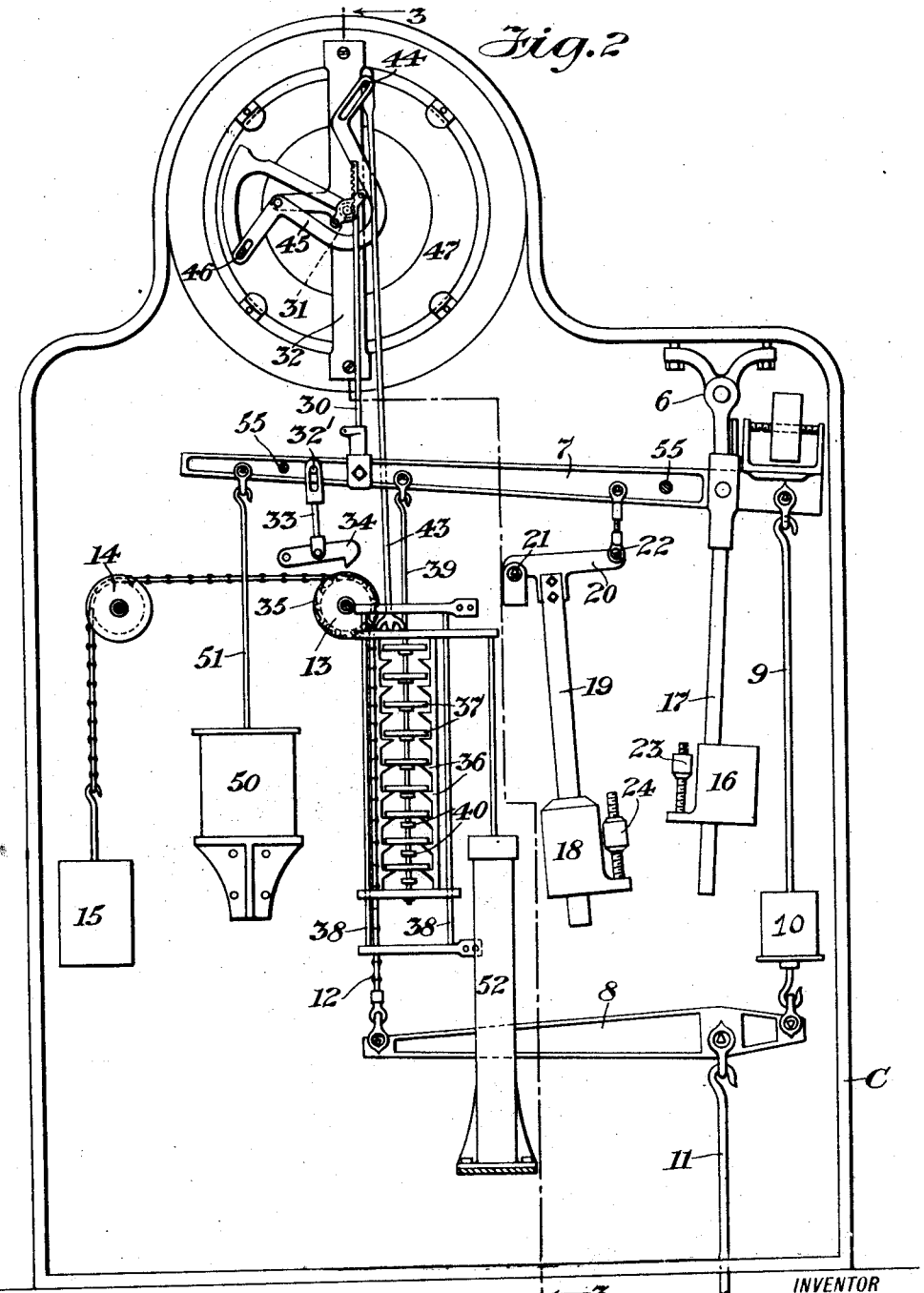
Figure 2 is a view similar to Figure 1 but showing the position of the parts when a load greater than a predetermined weight is placed on the load receiver.
Figure 3:
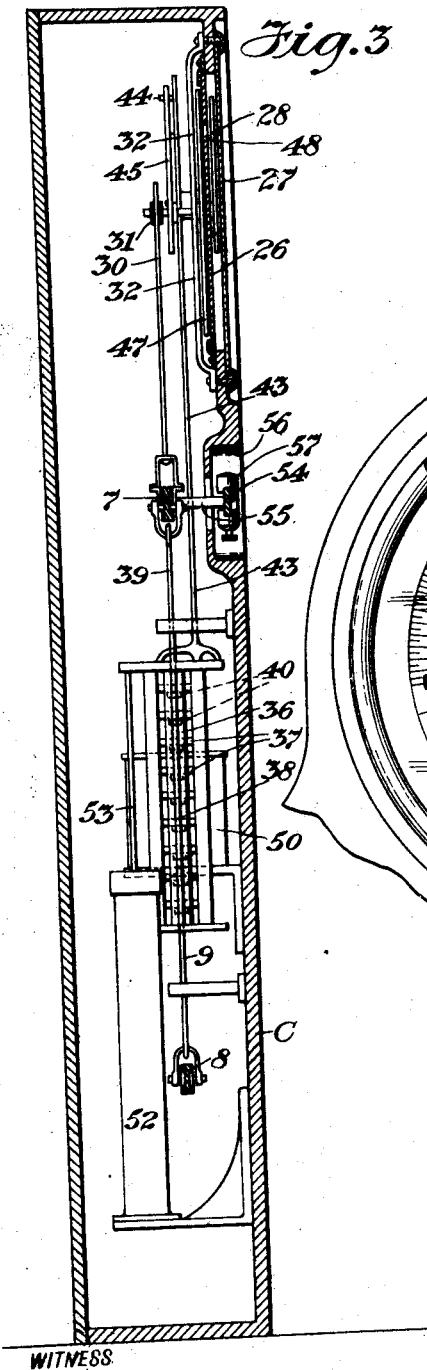
Figure 3 is a sectional side elevation taken substantially on the line 3—3 of Figure 1, looking in the direction of the arrow.
Figure 4:
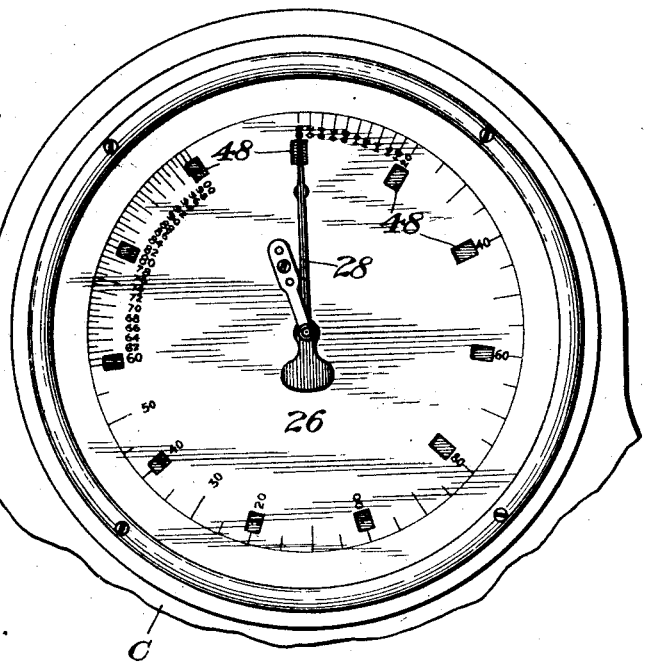
Figure 4 is a front elevation of dial mechanism upon which to indicate the weight of a load on the load receiver.

The embodiment of my invention shown in the drawings comprises a casing C in which the operative parts of the weighing mechanism are enclosed. Pivotally supported in said casing as by a bracket 6 is a scale-beam to which is connected at one side of its fulcrum support a weighing lever 8 by a link 9 arranged with a cup 10 for counterbalance weight. By means of a draft rod 11 there is connected to or suspended from the weighing lever a load receiver or platform supported by suitable levers as usual (not shown). The end of the lever opposite to its connection with the scale-beam is connected to one end of and supported by a suspender 12, in the form of a sprocket chain passing over a rotatable sprocket wheel 13 and a pulley 14, and said floating or movable support for the weighing lever is maintained in a predetermined position with no load on the receiver, or a load with a predetermined weight thereon, by a counterweight 15 connected to the end of the suspender opposite to its connection with the weighing lever.

To counterbalance and weigh a load on the load receiver within a predetermined weight there is connected to the scale-beam a counterpoise weight 16 carried by a downwardly extending arm 17, in the form of a pendulum, secured to the scale-beam in line with the pivotal support of the same. To assure the scale-beam and fulcrum being in balance due to the support of the weighing mechanism being out of level or otherwise there is provided a supplemental counterweight 18 carried by an arm 19 secured to a lever pivotally supported at one end, as at 21, and the opposite end adjustably connected to the scale-beam at a point forward of its pivotal support, as at 22. These weights 16 and 18 have adjusting means 23 and 24.

The weight of the load on the receiver is transmitted by the lever system of the load receiver or platform by means of the draft rod 11 to the weighing lever 8 pulling down the right hand end of said lever, and this movement of the lever causes the right hand end of the scale-beam through the link 9 to deflect a like amount. The torque of such deflecting movement or force is about the fulcrum of the scale-beam, and is counterbalanced by the primary pendulum weight 16 and the auxiliary or compensating weight 19, and this condition will prevail when the load upon the receiver is within a predetermined weight. The weight of a load within such predetermined weight is indicated by a pointer 28 on a fixed graduated dial 26 exposed through an opening in the casing which is closed by a glass 27. This dial is herein termed a "primary dial" and is of a capacity to indicate the weight of a load upon the receiver up to two hundred (200) pounds.

The pointer or indicator is actuated through the deflecting movements of the scale-beam. As the load is placed upon the load receiver and thereby the left hand end of the scale-beam raised the pointer is moved around the dial by a toothed rack at the upper end of a vertical rod 30 carried by the scale-beam meshing with a pinion 31 rotatably supported in a supporting bracket 32 for the dial and to which the pointer 28 is fixed to participate in the rotary movement of the pinion.

When a load greater than the dial capacity is placed on the load receiver the pointer is moved beyond the last graduation on the dial by the movement of the scale-beam, and during this movement of the scale-beam a pin 32' carried thereby, and engaging in a slot in a trig 33 connected to a pivotally supported pawl 34, engages with the upper wall of said slot thereby lifting said pawl from a ratchet wheel 35 rotatable with the sprocket wheel 13 releasing said wheel and permitting the load on the receiver to pull the fulcrum end of the weighing lever 8 downward against the action of the counterweight 15. During this movement of the lever and suspender 12 a frame 36 supported to have sliding vertical movement upon rods 38 and connected to the suspender 12 is caused to participate in the movement of said suspender. This frame carries a series of counterpoise weights 37 to co-operate with the weight 15 to normally maintain the lever 8 in equilibrium. The counterpoise weights 37 have central perforations in superposed relation. A rod 39 suspended from the scale-beam passes through the central perforations in the counterpoise weights 37 and has a series of seats 40 fixed thereto, these seats being so spaced and arranged that the counterpoise weights will be successively transferred, beginning with the uppermost weight, from the carrying frame 36 to said seats and thereby applied to the scale-beam. There are nine of the counterpoise weights 37 each of which has the same value as the capacity of the dial 26 so that the total weighing capacity of the weighing mechanism is ten times the initial capacity of the primary dial 26. As the counterpoise weight carrier descends the weights are consecutively and automatically deposited upon the rod seats 40 in such number until the left hand end of the scale-beam is depressed and until the overweight is neutralized by the corresponding decrease in the combined effect of the opposed scale-beam primary and compensating weights due to the descent of the scale-beam, the the latter descending sufficiently to release the pawl 34 to cause it to again engage the ratchet wheel 35 and thereby retain the counterpoise weight carrier against movement when the pointer will again be in position in the graduated portion of the dial and indicate the weight of the load on the receiver.

Simultaneously with the foregoing described downward movement of the counterpoise weight carrier a weighted rod 43 resting upon said carrier will move downward, and during such movement said rod will operate to intermittently rotate a supplemental dial 47, herein termed the "multiple unit dial", through a pin and slot connection 44 with one end of a pivotally supported lever 45 and connected at the opposite end, as at 46, with said multiple unit dial 47. The dial 47 has indices or figures thereon to be exposed through openings 48 in the fixed dial 26 in conjunction with the graduations on said latter dial. The increment of movement of the rod 43 is such that as each counterpoise weight 37 is applied to the rod seats 40 the multiple unit dial will be rotated or moved through successive predetermined arcs and causing one successive unit multiple to be exposed through the dial openings 48.

After the weight of the load on the receiver indicated on the dial has been recorded and as the load is removed from the receiver, and thus the right hand end of the weighing lever relieved of the pull of such load, the scale-beam will move to its original position of rest, and the counterweight 15 which is no longer exceeded by the pull of the weight of the load on the suspender through the weighing lever moves the left hand end of the weighing lever upward and with it the carrier for the counterpoise weights, the latter being automatically taken or picked up by the carrier from the rod seats 40, when the mechanism is again in condition to weigh another load.

To prevent vibration of the pointer 28 through movement of the scale-beam there is provided a shock absorber 50 which is in the nature of a dash pot, the plunger of which is connected by a rod 51 to the scale-beam. To prevent vibration of the multiple unit dial there is provided a second dash pot 52 the plunger of which is connected to the counterpoise weight carrying frame by a rod 53.

To take the tare of trucks or containers for articles being weighed there is provided a supplemental graduated scale-beam 54 which is carried by studs 55 projecting forward from the scale-beam 7 and through slots in the casing so that the supplemental scale-beam 54 will occupy a position in a recessed portion 56 of the casing, said beam having a counterpoise weight 57 adjustably mounted thereon.

Having thus described my invention, I claim:

1. In weighing mechanism, the combination of a scale-beam; a weighing lever connected to the scale beam arranged to support a load; a movable support for said lever; a series of auxiliary counterpoise weights connected to the lever support and normally free of the weighing mechanism; counterpoise weight connected to the beam operative to bring the beam into equilibrium with a load supported by the lever within a predetermined weight; means carried by the scale beam arranged in operative relation to the auxiliary counterpoise weights on the lever support adapted to transfer said counterpoise weights automatically as successive increments from the lever support to the scale beam when the load supported by the lever exceeds such predetermined weight for the purpose specified.

2. In a weighing scale, the combination of a weighing lever arranged for connection of a load support; a scale beam to which the lever is operatively connected at one end; counterpoise weight to co-operate with the beam to counterbalance the load supported by the weighing lever within a predetermined weight; movable means including a counterweight to suspend the lever from the end opposite to its connection with the scale beam; means to control the movement of said lever suspension means governed by the scale beam; and auxiliary counterpoise weights normally free of the scale beam when weighing a load within said predetermined weight and adapted to be automatically applied to the scale beam by the movement of the lever suspension means when a load exceeds such predetermined weight.

3. In a weighing scale, the combination of a weighing lever arranged to support a load; a scale beam connected to the weighing lever arranged with counterpoise weight operative to counterbalance a load within a predetermined weight; a movable support for said lever; means governed by the scale beam to control the movement of the lever support; means operative from the beam to indicate the weight of the load within said predetermined weight; auxiliary counterpoise weight connected to the lever support; and means operative to transfer the auxiliary counterpoise weight from the lever support to the beam through the action of the lever and beam when the load exceeds such predetermined weight and indicate such excessive weight.

4. In a weighing scale, a scale beam; a weighing lever connected to the scale beam and arranged to suspend a load receiver therefrom; primary counterpoise arranged on said beam to counterbalance a load within a predetermined weight; an adjustable suspender to one end of which the lever is connected and having a counterweight connected to the opposite end; means to control the movement of said lever suspension means governed by the scale beam; a carrier for a series of counterpoise weights connected to said suspender to participate in the movement thereof; and means carried by the beam to which the counterpoise weights are successively transferred when the load exceeds such predetermined weight and from which the counterpoise weights are transferred to their carrier by a reduction in the load.

5. In a weighing scale, a scale-beam; a weighing lever connected to the scale-beam and arranged to suspend a load receiver therefrom; a suspender to one end of which the lever is connected and having a counterweight connected to the opposite end; a rotatable support for the suspender arranged to be held against movement when the weight on the load receiver is within predetermined limits and means to release the support when the load on the receiver exceeds such predetermined weight for the purpose specified.

6. In weighing mechanism, a scale beam; a weighing lever connected to the scale beam having means to support a load therefrom and to co-operate with the scale beam to weigh a load within a predetermined weight; a dial; means operable from the weighing mechanism to indicate the weight of such load on the dial; auxiliary counterpoise weight carried by the support for the lever normally free of the weighing mechanism; means carried by the scale beam to automatically take up the auxiliary counterpoise weight to counterbalance a load in excess of such predetermined weight; and means operable from the lever to indicate such excessive load on the dial.

7. In weighing mechanism, a lever having means to support a load; a scale beam to which the lever is connected having counterpoise weight operatively connected thereto to automatically counterbalance a load within a predetermined weight; means with which the scale beam co-operates to indicate the weight of such load; a series of counterpoise weights normally supported by the lever support free of the weighing mechanism; and means connected to the scale beam arranged to automatically and successively take up such counterpoise weights when the load exceeds such predetermined weight and return such counterpoise weights to their support when the weighing mechanism is relieved of such excess load; and means operative from the lever to indicate such excess load in conjunction with the weight of the load within a predetermined weight.

8. In weighing mechanism, a weighing lever arranged to support a load; a movable support for the lever arranged with means to yieldingly resist the movement thereof; a beam connected to the lever arranged with primary counterpoise weight to counterbalance a load within a predetermined weight; a carrier for auxiliary counterpoise weight connected to and movable with the lever support; and means under the control of the beam to govern the movement of said lever support and carrier, said carrier being operative when the load exceeds a predetermined weight to automatically transfer the auxiliary counterpoise weight from the carrier to the beam and take up such counterpoise weight from the beam when the excess load is removed.

9. In weighing mechanism, a weighing lever arranged to support a load to be weighed; a beam connected to the lever; a movable support for the lever; yielding means connected to the support to resist the movement thereof; means under the control of the beam to govern the movement of said lever support; and counterpoise weight normally carried by and movable with the lever support and arranged to be automatically transferred to the beam when a load is applied to the lever to counterbalance said load and to take up said counterpoise weight from the beam when the load is removed from the lever.

10. In weighing mechanism, a weighing lever arranged to support a load; a beam connected to the lever; a movable support for the lever; means under the control of the beam to govern the movement of the lever support; means to support counterpoise weight independent of the beam connected to the lever support to have movement therewith and operative to transfer said counterpoise weight to the beam when a load is applied to the lever and the support for the counterpoise weight is moved in one direction with the lever support to counterbalance the load supported by the lever and transfer said counterpoise weight from the beam to its support as said counterpoise weight support is moved in opposite direction with the lever support as the load is removed.

11. In a weighing scale, a scale-beam; a weighing lever connected to the scale-beam and arranged to support a load; a suspender to one end of which the lever is connected; a counterweight connected to the other end of the suspender; a rotatable support for the suspender; means under control of the beam to govern the movement of the support; a weight carrier connected to the suspender at the side of its support at which the lever is connected to the suspender to have movement therewith; and a carrier for said weights connected to the scale-beam, said carrier being arranged whereby during the movement of the lever suspender the weights will be automatically transferred from one carrier to the other in accordance with the weight of the load.

12. In a weighing scale, a scale-beam; a weighing lever connected to the scale-beam and arranged to have a load receiver connected thereto; a suspender to one end of which the lever is connected to support the lever; a movable support for the suspender; a counter weight connected to the end of the suspender opposite to the lever adapted to move the lever to a predetermined position with no load on the receiver; releasable means to co-operate with the suspender support to normally maintain the suspender support from movement and thereby retain the suspender in said latter position, said means being releasable under the control of the scale beam when the load on the receiver exceeds a predetermined weight for the purpose specified.

13. In a weighing scale, a scale-beam; a weighing lever connected to the scale-beam and arranged to have a load receiver connected thereto; a suspender to one end of which the lever is connected to support the lever; a rotatable support for the suspender; a counterweight connected to the end of the suspender opposite to the lever adapted to move the lever to a predetermined position with no load on the receiver; a ratchet wheel rotatable with the suspender support; and a pawl under the control of the beam to co-operate with the ratchet wheel to normally hold the support from movement with the counterweight and lever in no load position, said pawl being releasable from the ratchet wheel when the load on the receiver exceeds a predetermined weight for the purpose specified.

14. In a weighing scale, a scale-beam; a weighing lever connected to the scale-beam and arranged to have a load receiver connected thereto; a suspender to one end of which the lever is connected to support the lever; a rotatable support for the suspender; a counterweight connected to the end of the suspender opposite to the lever to move the lever to a predetermined position with no load on the receiver; and pawl and ratchet mechanism to normally hold the lever support in said latter position, said pawl being releasable from the ratchet mechanism by the scale-beam when the load on the receiver exceeds a predetermined weight for the purpose specified.

15. In a weighing scale, a scale-beam; a weighing lever connected to the scale-beam and arranged to have a load receiver connected thereto; a suspender to one end of which the lever is connected to support the lever; a movable support for the suspender; a counterweight connected to the end of the suspender opposite to the lever adapted to move the lever to a predetermined no load position; releasable means under control of the scale-beam to co-operate with the suspender support to normally hold the support from movement and retain the suspender in said latter position, said means being releasable when the load exceeds a predetermined weight; a slidably supported counterpoise weight carrier adapted to participate in the movement of the suspender support; means suspended from the scale-beam coaxially with the counterpoise weight, said counterpoise weight carrier being arranged to apply said weights to said means suspended from the scale-beam when the lever suspender moves in one direction and take up said counterpoise weight when the lever suspender moves in the opposite direction for the purpose specified.

16. In a weighing scale, a scale-beam; a weighing lever connected to the scale-beam and arranged to have a load receiver connected thereto; a suspender to one end of which the lever is connected to be supported thereby to have downward and upward movement; a rotatable support for the suspender; a counterweight connected to the other end of the suspender adapted to move the suspender and thereby the lever to a predetermined position with no load on the receiver; means to retain the rotatable support in such position releasable by the scale-beam when the load on the receiver exceeds a predetermined weight; a slidably supported carrier for a series of superposed counterpoise weights perforated centrally thereof, said carrier being arranged to have participating movement with the lever suspender; a rod suspended from the scale-beam to extend through the perforations in the counterpoise weights and having variably spaced seats thereon to which the counterpoise weights are successively applied from the carrier during the downward movement thereof with the suspender, and to successively take up said counterpoise weights during the upward movement of the carrier with the suspender for the purpose specified.

17. In a weighing scale, a scale-beam; a weighing lever connected to the scale-beam arranged to support a load; a support for the weighing lever arranged to permit of the lever to have downward and upward movement in accordance with a load supported thereby greater than a predetermined weight; a series of counterpoise weights and a carrier therefor arranged to have participating movement with the lever support, and adapted to automatically apply said counterpoise weights successively to the scale-beam in accordance with the increase of the load beyond a predetermined weight, and to automatically take up said counterpoise weights from the scale-beam when the load is removed from the lever; means controlled by the movement of the scale-beam to control the movement of the carrier for the counterpoise weight; a fixed dial; a pointer operable to indicate the load within a predetermined weight; a rotatable dial; and an operative connection between said latter dial and the carrier for the counterpoise weights to intermittently advance the rotatable dial and arranged to successively expose units thereon in relation to the fixed dial with the increase in the weight of the load for the purpose specified.

18. In a weighing scale, a scale-beam, a weighing lever connected to the scale-beam and arranged to have a load receiver connected thereto; a series of counterpoise weights; a carrier therefor connected to the lever arranged to automatically apply the counterpoise weights successively to the scale-beam when the load on the receiver exceeds a predetermined weight; means under control of the scale beam to govern the movement of the carrier; a fixed dial; a rotatably supported pointer operable from the scale-beam to indicate the weight of the load on the receiver within a predetermined weight; a rotatable dial juxtaposed to the fixed dial and an operative connection between the rotatable dial and the carrier for the counterpoise weights to intermittently advance said rotatable dial to successively expose units thereon in relation to the fixed dial to indicate the weight of loads on the receiver greater than such predetermined weight.

19. In weighing mechanism, the combination of load supporting means; primary counterpoise means to which the load supporting means is connected to counterbalance loads within a predetermined weight; auxiliary counterpoise weight normally free of the primary counterpoise means; and means under the control of the load supporting means and primary counterpoise means operative to automatically transfer the auxiliary counterpoise weight to the primary counterpoise means when the load exceeds such predetermined weight to counterbalance such excessive weight.

20. In weighing mechanism, the combination of load supporting means; primary counterpoise means to which the load supporting means is connected to counterbalance loads within a predetermined weight; auxiliary counterpoise weight normally free of the primary counterpoise means; an indicator operative from the primary counterpoise means to indicate the weight of loads within such predetermined weight; and means under the control of the load supporting means and primary counterpoise means automatically operative to transfer the auxiliary counterpoise weight to the primary counterpoise means when the load exceeds such predetermined weight to counterbalance such excessive weight.

21. In weighing mechanism, the combination of load supporting means; primary counterpoise means to which the load supporting means is connected to counterbalance loads within a predetermined weight; auxiliary counterpoise weight normally free of the primary counterpoise means; an indicator operative from the primary counterpoise means to indicate the weight of loads within such predetermined weight; means under the control of the load supporting means and primary counterpoise means automatically operative to transfer the auxiliary counterpoise weight to the primary counterpoise means when the load exceeds such predetermined weight to counterbalance such excessive weight; and means to indicate the weight of loads in excess of said predetermined weight in conjunction with the indication of a load within said predetermined weight.

22. In weighing mechanism, the combination of load supporting means; primary counterpoise means to which the load supporting means is connected to counterbalance loads within a predetermined weight; auxiliary counterpoise weight normally free of the primary counterpoise means; means under the control of the load supporting means and primary counterpoise means operative to automatically transfer the auxiliary counterpoise weight to the primary counterpoise means when the load exceeds such predetermined weight to counterbalance such excessive weight; and adjustable counterpoise weight coacting with the primary counterpoise means to counterbalance the tare of a carrier for a load.

HERBERT L. MERRICK.